United States Patent [19]

Walkow

[11] 4,431,964
[45] Feb. 14, 1984

[54] METHOD FOR DETERMINING A NATURAL CURRENT FLOW IN WELL CASING

[75] Inventor: Arnold M. Walkow, Houston, Tex.

[73] Assignee: Dresser Industries, Inc., Dallas, Tex.

[21] Appl. No.: 306,017

[22] Filed: Sep. 28, 1981

[51] Int. Cl.³ .......................................... G01R 27/02
[52] U.S. Cl. ................................................ 324/65 R
[58] Field of Search .............. 324/65 R, 65 P, 65 CR, 324/64

[56] References Cited

U.S. PATENT DOCUMENTS

| | | | |
|---|---|---|---|
| 2,459,196 | 1/1949 | Stewart | 324/64 X |
| 2,553,350 | 0/0000 | Bayhi . | |
| 2,896,159 | 7/1959 | Webster | 324/64 |
| 2,922,103 | 1/1960 | Smith | 324/64 UX |
| 3,207,981 | 9/1965 | Marsh et al. | 324/64 X |
| 3,995,213 | 11/1976 | Robinson et al. | 324/64 |
| 4,048,558 | 9/1977 | Goodman | 324/65 R X |
| 4,178,543 | 12/1979 | Wrinn et al. | 324/64 |

Primary Examiner—Stanley T. Krawczewicz
Attorney, Agent, or Firm—Richard M. Byron; Patrick H. McCollum

[57] ABSTRACT

A method is provided for determining the natural current flow in the casing of a well. The method includes measuring the native voltage between two locations in the casing during natural current flow conditions. A known electrical current is then passed through the well casing and the voltage between the two locations is measured again. The casing resistance between the two locations is then determined from the voltage measurements and known electrical current. The native current flow in the casing is then determined from the native voltage measurement and the casing resistance.

17 Claims, 12 Drawing Figures

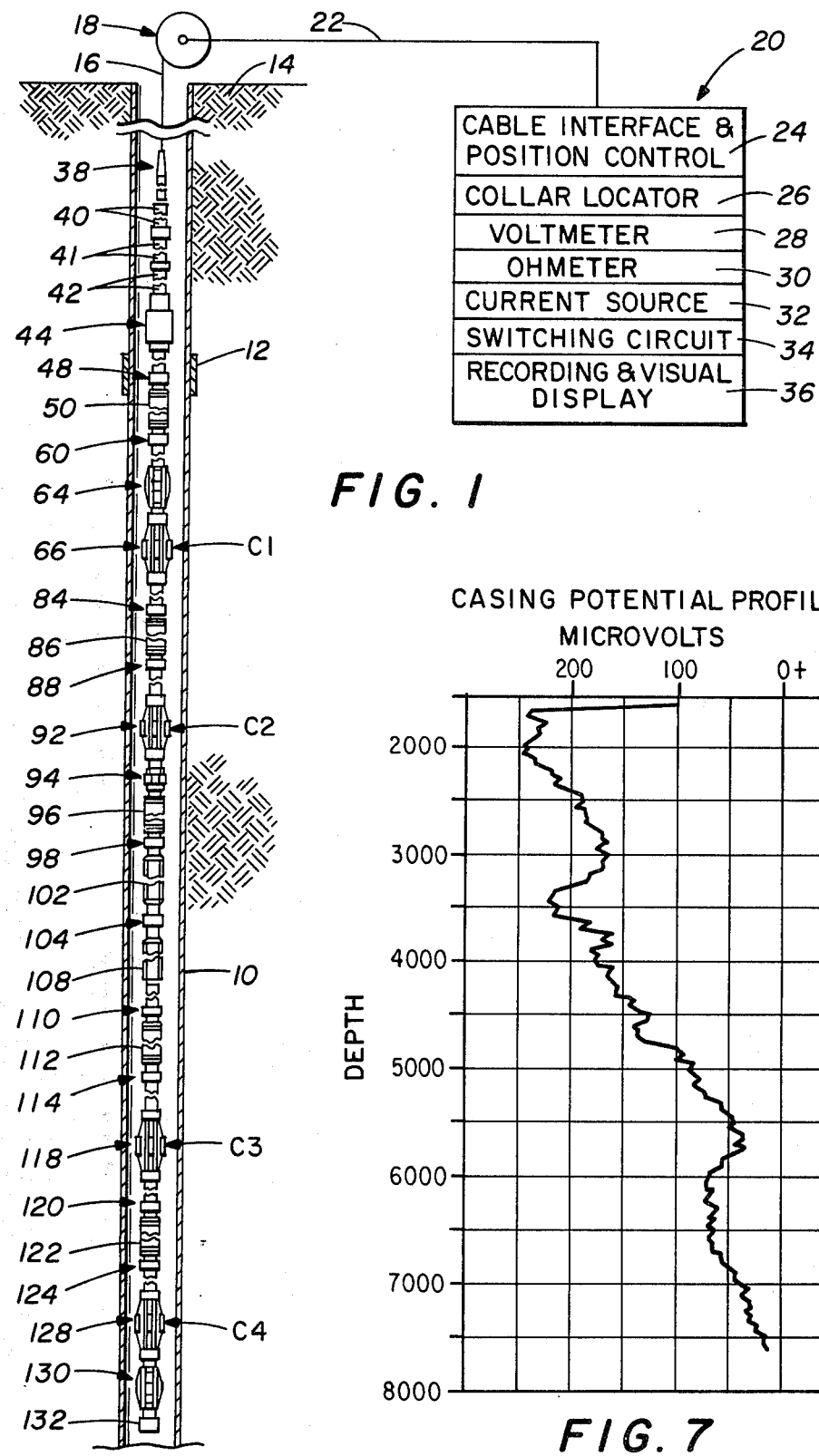

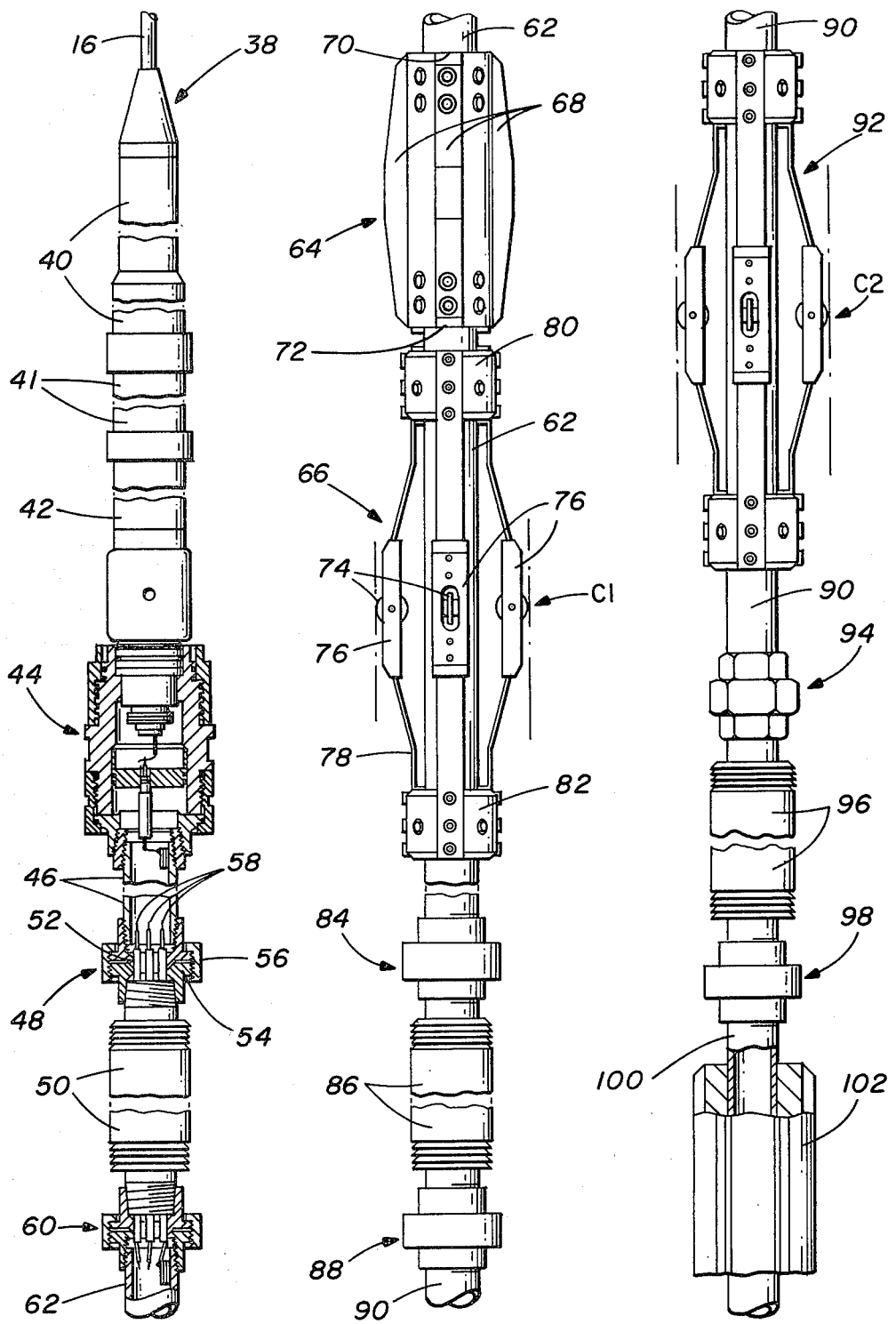

METHOD FOR DETERMINING A NATURAL CURRENT FLOW IN WELL CASING

TECHNICAL FIELD

This invention is related to the cathodic protection of wells. More specifically the invention is related to a method for the determination of native or existing current flow within the metal casing of a well.

BACKGROUND OF THE INVENTION

In oil and gas wells and other wells the lining or casing thereof consists of a string of segments of metal tubular members joined by collars. Because this string of casing may span several different zones in the earth, and because it is an electrical conductor it will pass natural electric currents between zones spaced away from the casing from one zone to another zone that is in contact with the casing. The passage of electric currents away from the casing will cause a deterioration of the metal casing due to ionization of the metal and displacement of it into the formation in the form of a chemical compound. When this occurs, material of the casing is displaced and the casing is in effect corroded. If this action continues over a significant period of time the well casing can become perforated or at least not safe for the containment of well pressure. Once the well casing becomes perforated due to this deterioration it can damage the well due to permitting fluid flow into or out of the casing at this unpredicted and probably undesirable location. Leakage such as this can permit well fluids to move between zones and earth formation and not only damage the well but perhaps the surrounding zones in the earth formations by contaminating them with fluids from other zones through which the well passes.

Cathodic protection for a well can overcome the aforementioned problems. This is done by circulating an artificial current between the well and the surrounding earth formation to oppose the type of natural current that causes deterioration of the well's casing. In order to properly apply such a current, it is desirable to determine the amount and polarity of natural current flow so that adequate protection can be employed. Once the amount of natural current flow between the well casing and the earth's formation is determined, this will allow the skilled corrosion engineer to establish criteria for protecting the well by passing an appropriate current to oppose the natural current flow.

Prior to this invention the determination of this natural current flow in the well was done by measuring the voltage at selected points within the well casing and determining the current by using the casing resistance as defined in manufacturer's data of the casing. This prior technique was not particularly satisfactory nor accurate for several reasons. The resistance data available for casing is limited only to new material and thus is not accurate for casing that has been slightly corroded after being within a well. Even new casing material contains alloy variations and dimensional tolerances which introduce considerable errors into the manufacturer's resistance data. Using these resistance values may be accurate for a newly completed well however they will be inaccurate for a well when the casing corrsion is to be monitored later in the well's life.

It is interesting to note that in older wells the well's owner may not know the type or grade of casing in the well. In this situation, it is not possible to know the resistance of the casing when it was new and it is nearly impossible to estimate what it may be at some point in time many years after the well was completed. Situations such as this render previous current determination techniques unusable.

SUMMARY OF THE INVENTION

An embodiment of this invention is an apparatus which includes an instrument that can be passed through the interior of casing in a well and operated at any selected location therein to make measurements usable in a determination of the casing resistance at that location and in turn the flow of current relative to the earth formation.

An embodiment of the method of this invention involves passing a current of known magnitude through a selected segment of the casing and making an appropriate voltage measurement so that resistance of the casing can be calculated and accordingly the current flow in the well casing at this location can be determined.

One object of this invention is to provide a method and apparatus for determining the natural current flow in well's casing that overcomes the disadvantages and inaccuracies of the prior art methods and devices.

Still, another object of this invention is to provide and instrument that can be passed through the interior of a well's casing to measure the resistance of the casing at a selected location between connecting collars within the casing.

Still, another object of this invention is to provide an instrument with a plurality of sets of rollers to contact the interior of the casing in a well for the purpose of measuring voltages in the casing and passing known currents through the casing for determining resistance of the casing.

Various other objects, advantages and features of this invention will become apparent to those skilled in the art from the following discussion taken in conjunction with the accompanying drawings, in which:

DESCRIPTION OF THE DRAWINGS

FIG. 1 is a cutaway representation of a well having the instrument of this invention located therein and connected by hoisting apparatus at the earth's surface to appropriate surface control, operating and recording equipment;

FIG. 7 is a graph of measured voltage versus well depth.

Figure 2D:
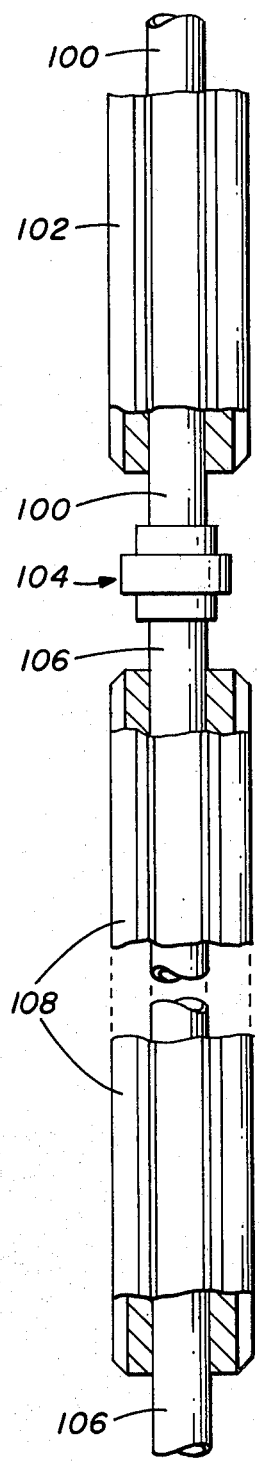
FIG. 2 (a-f) is a lengthwise sectioned and partially cutaway view of the downhole instrument of this invention.

The following is a discussion and description of preferred specific embodiments of the current measuring apparatus and the method of this invention, such being made with reference to the drawings whereupon the same reference numerals are used to indicate the same or similar parts and/or structure. It is to be understood that such discussion and description is not to unduly limit the scope of the invention.

DETAILED DESCRIPTION OF THE PREFERRED EMBODIMENT

Referring to FIG. 1 such shows pictorially a portion of a well including an earth borehole lined with casing 10. Casing 10 is mounted within the interior of the borehole and is comprised of a plurality of tubular segments connected by casing collars 12. The borehole instrument 14 is suspended on an armored electrical logging cable 16 from a hoist 18 at the earth's surface. Surface electronic equipment, indicated generally at 20, is electrically connected to hoist 18. Hoist 18 includes a conventional well logging cable drum or reel on which armored logging cable 16 is wound. Cable drum has a plurality of slip rings providing an electrical connection between armored logging cable 16 and the associated equipment as is well known in the art and shown in U.S. Pat. No. 2,892,977, R. Monaghan and U.S. Pat. No. 2,760,078, A. H. Youmans. Surface electronic equipment 20 is electrically operably joined to cable 16 and borehole instrument 14 by an interconnecting electrical cable 22 from slip rings on hoist 18. Surface equipment 20 includes a cable interface and position control 24, a collar locator indicator 26, a voltmeter 28 and OHM meter 30, a current source 32, a switching circuit 34 and a recording and visual display 36. The cable interface and position control 24 segment of the surface equipment performs two functions. First, it is an electrical connection between interconnecting electrical cable 22 and the several components of the surface equipment. Second, it functions to cause rotation of the surface equipment. Second, it functions to cause rotation of the cable reel of hoist 18 to unroll or wind in the armored electrical logging cable in order to displace borehole instrument 14 through the well and provide a representation of the depth of the instrument in the well. Similar functioning apparatus is known in the art and is illustrated in the U.S. Pat. No. 2,776,378 to A. H. Youmans and U.S. Pat. No. 2,903,594 to R. E. Fearon et al. Current source 32 voltmeter 28 and switching circuit 34 are designed to be operable in either single or multiple modes of operation to function with direct current signals, or pulsed current signals in order to be compatible with several embodiments of this invention. The construction of these portions of the surface equipment is well known in the art and will not be described herein because such is not the main subject matter of this invention. Selected portions of these components of the surface euipment will be described in greater detail in the following discussion.

Figure 2E:
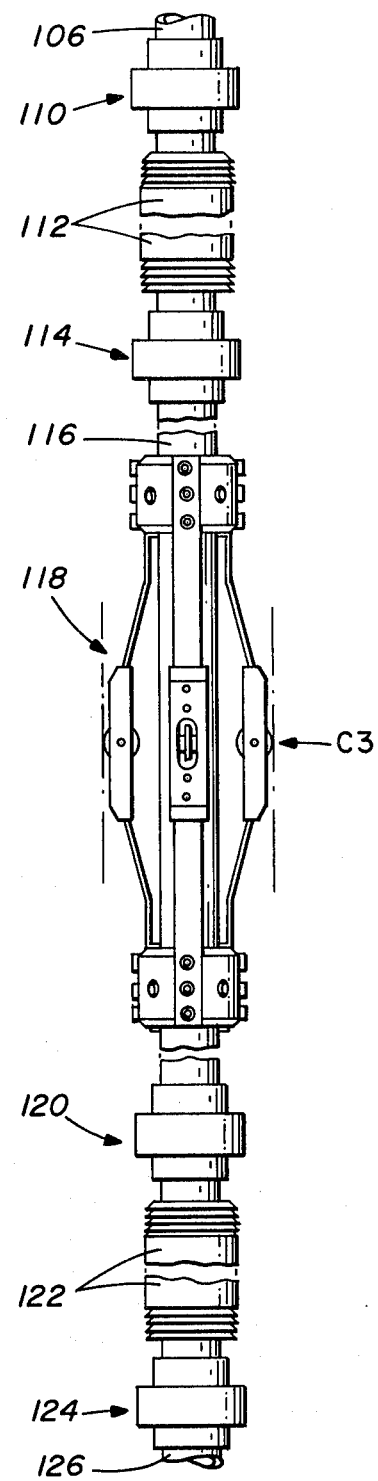
Figure 2F:
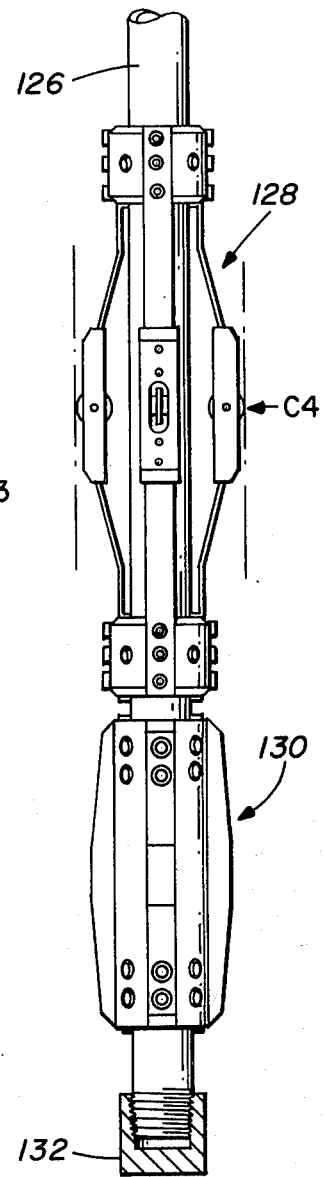

FIG. 2, in segments (a-f) show downhole instrument 14 of this invention in a longitudinally, segmented and shortened view with portions of the housing cutaway to expose some interior elements. The instrument has a tubular, skeletal-like housing indicated generally at 38 and comprised of a plurality of segments that are joined as shown for use. At the top of the instrument cable 16 is connected with cable head 40 that physically attaches the cable to the instrument and provides electrical connection. Below cable head 40 swivel 41 adapted to provide free rotation of the lower portion of the instrument relative to cable 22. Swivel 41 prevents twisting of the instrument due to the natural tendency of cable 22 to twist as it moves through a well casing. Below swivel is a casing collar locator 42. Casing collar locator sensor 42 is operable with the collar locator apparatus 26 in surface equipment 20. Below casing collar locator sensor 42 is a housing adapter segment 44 for joining larger diameter segments 40 and 42 with the smaller diameter segments below.

The major lengthwise portions of housing 38 is comprised of a plurality of segments joined by couplers. This plurality of segments consists of operating elements which are metallic and can have some functional element attached thereto. Other segments in this housing function as insulators to electrically insulate the operative segments. All of these housing segments are tubular members which have one or more electrical conductors or wires therethrough to operatively connect the functioning elements with a terminal in housing adapter segment 44 and in turn with surface equipment 20 through cable 16.

Housing segment 46 is threadedly mounted to the lower portion of housing adapter segment 46 with an insulator housing segment 50. Coupler 48 is similar to a union coupler used in plumbing connections wherein each tubular segment attached to the union has a flanged member 52 and 54 mounted therewith to provide for structural support and for fluid type sealing of the conduit formed by the attached tubular members. The flanged elements are positioned in a face to face relation and encircled by a collar 56 that is internally threaded to compressibly clamp the two flanged elements in their operative face to face relation.

Insulator housing segment 50 provides a mechanical connection between the electrically conductive segments of the housing that insulates them electrically from one another. This segment also contains a plurality of electrically conductors or wires 58 that provide electrical communication through the insulator for connection to elements below as can be seen in FIG. 2(a). The insulator housing segments used in this are each provided with a plurality of electrical conductors therethrough and appropriate terminals for connection with wires located in other portions of the housing.

In the following description each of the couplers and insulators will be identified by separate numerals however structurally they have the similar configuration.

Below insulator housing segment 50 is coupler 60 joining to housing segment 62. Housing segment 62 has an upper centralizer 64 mounted thereon above an upper or first roller assembly 66. Upper centralizer 64 has a plurality of outwardly extending and rigid centralizer fins 68. Centralizer fins 68 are removably mounted with the housing to provide for replacement. Support for centralizer fins 68 is a mount member 70 on the housing which has the centralizer fins bolted thereto. These centratlizer fins are replaceable so that centralizer fins of different dimensions may be substituted in order to adapt the instrument in use in wells having different diameter casings. The dimensions of centralizer fins 68 are varied according to the internal diameter of the casing of a particular well to limit the maximum deformation of leaf springs in upper roller assembly 66 to prevent overstressing and damage to the springs and rollers.

Spaced slightly below upper centralizer 64 is upper or first roller assembly 66 that includes a plurality of rollers 74 rotatably mounted in roller support 76 and supported on leaf springs 78. Rollers 74 form contacts that function as electrodes to electrically connect the electronic equipment with the casing material that is being measured. Leaf springs 78 are bridgingly supported between an upper mount 80 and a lower mount 82 attached to housing segment 62. Roller supports 76 are located at a mid portion of leaf srpings 78 so that rollers 74 are positioned at substantially the longitudinal mid-point of leaf springs 78. Rollers 74 each have a rotary knifelike outer peripheral edge portion that is substantially perpendicular to the rotatable axis of the rollers. The knifelike portion of the rollers will roll longitudinally along the interior surface of a well's casing and make electrical contact therewith. Upper roller assembly 66 has been constructed with four (4) of the described leaf springs, roller supports and rollers and these are positioned in an equally spaced relation around the housing. It is to be understood that any number of such leaf spring, roller support and roller assemblies may be utilized in a roller assembly such as one (1), two (2), three (3), four (4) or five (5) of such assemblies. For operational convenience it has been found that four (4) of such leaf springs and rollers and roller supports in each of the four complete roller assemblies in this instrument are desirable. The rollers 74 of upper or first roller assembly 66 when inserted in a casing string form an electrical contact electrodes with the interior wall of the casing. For identification purposes in the following description of this invention this contact is identified as C1.

Below upper roller assembly 66 a coupler 84 joining housing segment 62 with an insulator housing segment 86. Below insulator housing segment 86 another coupler 88 joining it with another housing segment 90 upon which a second roller assembly 92 is mounted. Second roller assembly 92 is mechanically identical to the first or upper roller assembly 66. Second roller assembly 92 provides a second electrode contact with the interior of the well casing as identified by C2. Below second roller assembly 92 a coupler 94 joins housing segment 90 with an insulator housing segment 96. Below insulator housing segment 96 another coupler 98 joins it with a weighted housing segment 100. Weighted housing segment 100 is an elongated housing member having a relatively dense weight 102 mounted therewith. Weight 102 is a tubular member rigidly mounted to housing segment 100 and extending substantially the length thereof. The function of weight 102 is to add mass to housing 38 for assistance in downward movement of this instrument through a well's casing string and for inertial stabilization when taking measurement. Below weighted housing segment 100 a coupler 104 joins housing segment 100 to another similar weighted housing segment 106 with a weight 108 rigidly mounted therewith and extending substantially the length thereof. Weight 108 is a dense tubular member identical to weight 102. Both of these weighted segments of the housing add substantial mass to housing 38 which assist in downward motion of the instrument through the casing string of a well.

At the lower end of housing segment 106 a coupler 110 joins that housing segment with an insulator 112. Insulator 112 is connected by a coupler 114 with another housing segment 116 upon which a third roller assembly 118 is mounted. Roller assembly 118 is mechanically identical to the above described roller assemblies and in the interest of brevity will not be described again in detail. Third roller assembly 118 provides a third electrode contact indicated at C3 for providing electrical connection with the interior of a well casing string.

A coupler 120 joins housing segment 116 with an insulator 122. A coupler 124 below insulator 122 joins it with another housing segment 126 upon which a fourth roller assembly 128 is mounted. Fourth roller assembly 128 is mechanically identical to the above described roller assemblies and in the interest of brevity will not be described again in detail. Fourth roller assembly 128 provides a fourth electrode contact indicated at C4 for electrically contacting the interior of a well's casing string.

Below fourth roller assembly 128 on housing segment 126 is a lower centralizer assembly 130. Lower centralizer 130 is mechanically identical to upper centralizer 64 and for this reason will not be described again. Lower centralizer 130 functions the same as upper centralizer 64 in maintaining the housing in a generally centralized position within a well casing. A plug 132 covers the lower end of housing segment 126 and seals the lower end of the housing.

In regard to electrical connections through the housing, this is accomplished by wires or electrical conductors located in the several housing segments and electrical conductors in the insulator housing segments. Each of the roller assemblies are provided with separate electrical conductors through the housings so they may be connected to separate conductors in cable 16.

Operation

In operation of the instrument of this invention it is first assembled in the configuration shown in FIG. 2, checked for operability of its several elements then connected to cable 16 and inserted in the well casing as shown in FIG. 1. In determining the natural current flow for a particular well it can be done as the downhole instrument moves downward in the well toward the bottom or as it moves upward from the bottom or both depending upon the desire of the user. Present practice is to stop movement of the instrument when the measurements are taken.

For explanation purposes consider the situation in which the well is to be logged from the earth surface down. First, the downhole instrument is positioned as shown in FIG. 1. The casing collar locator (26, 42) is used in positioning the instrument in the well casing string so that electrodes or contacts C1 and C4 are located between adjacent casing collars 12 on a single segment of casing. Positioning instrument 14 in this location is necessary so that the measurements are made on the casing segments and not through the casing collars. The positioning of instrument 14 is done by using hoist 18 and the position control 24 of surface equipment 20. In order to insure that all of the contacts are within the same joint of casing, the casing collar locator is used to determine the location of the upper collar on a segment of casing then the instrument is lowered so that the lower casing collar on that segment of casing is located. This use of the casing collar locator is particularly important in wells having short or non-standard lengths of casing so when a measurement is taken it is not taken across or through a casing collar. After this lower casing collar is located then the instrument is raised to a position between these adjacent casing collars on the same segment of casing so that all of the contacts will be resting on the interior of the same segment of casing.

It is to be noted that as instrument 14 moves through the well casing the plurality of rollers on the several roller segments have their knifelike exteriors urged into contact with the interior of the casing. The knifelike exterior of these rollers must cut through any corroded material, paraffin or other material that adheres to the interior of the casing so that good electrical contact can be made between the rollers and the metal of the casing. When the instrument is positioned at the location for a measurement to be taken, a preliminary check is made of each of the contacts to determine if they are seated or in good electrical contact with the casing wall. This check is accomplished by measuring the resistance between the several contacts in order to determine that there is continuity through the casing between the several contacts. In the event that agood electrical connection with the casing does not occur then the instrument is raised or lowered from its previous position slightly so that the rollers are moved to a different location within the casing so that good electrical contact can be established.

The immediately above described preparatory steps in making the instrument ready for use and ready for taking measurements is applicable to all of the following described embodiments of the method of this invention. In the several embodiments of the method of this invention the same general theme of making the measurements and determining the values is followed with some variations being made in the specific details of the various steps.

In a first (1) embodiment of the method of determining the natural current flow in a well casing once it is determined that the instrument is positioned at a location suitable for making these measurements then a measurement of the native voltage $E_n$ is made. This voltage measurement is taken between the innermost contacts C2 and C3 using voltmeter 28 in surface equipment 20. Voltmeter 28 is connected with its positive input connected to C3 and the negative input connected to C2. This is done to obtain voltage data for various locations in the well in order to make a graph plotting the measured voltage versus the well depth. In such a chart well depth is plotted downward and voltages are plotted horizontally as depicted in FIG. 7. In this graph a positive slope of the curve (upper left to lower right) indicates that current staying within or entering the well casing. A negative slope of this curve (lower left to upper right) indicates that current is leaving the well casing and passing into the earth formation. This measurement is accordingly recorded.

Next, a known current $I_k$ is passed between the outermost contacts C1 and C4 of the instrument by using current source 32 in the surface equipment. This current is passed between the outermost contacts C1 and C4 in order that it passes through the casing between the inner contacts C2 and C3 for the measurement of a voltage. In the passing of known current $I_k$ it is to be noted that passing the current in one direction will cause the total current flow in the casing to be increased due to both the native current $I_n$ and the known current $I_k$ traveling in the same direction. Alternatively in passing the known current $I_k$ in the opposite direction will decrease the total current flow in the casing because the native current $I_n$ and the known current $I_k$ will be moving in opposite directions or bucking each other. Thus in this situation the total or accumulative current flow in the casing will be less than that which would occur if both currents were traveling the same direction. In regard to determining the magnitude of the native current $I_n$ the direction of application of the known current $I_k$ can be varied at the desire of the person(s) practicing this method without departing from the spirit or scope of the invention. Calculations for determining $I_n$ and R can be done by the formulas shown in FIG. 3 without regard to the direction of application of the known current $I_k$.

Next, a measurement of the absolute voltage change E between the innermost contact C2 and C3. This value of resistance of the casing will obviously depend upon the physical condition of the casing and will obviously vary depending upon the extent of corrosion of the casing.

Figures 3, 4:
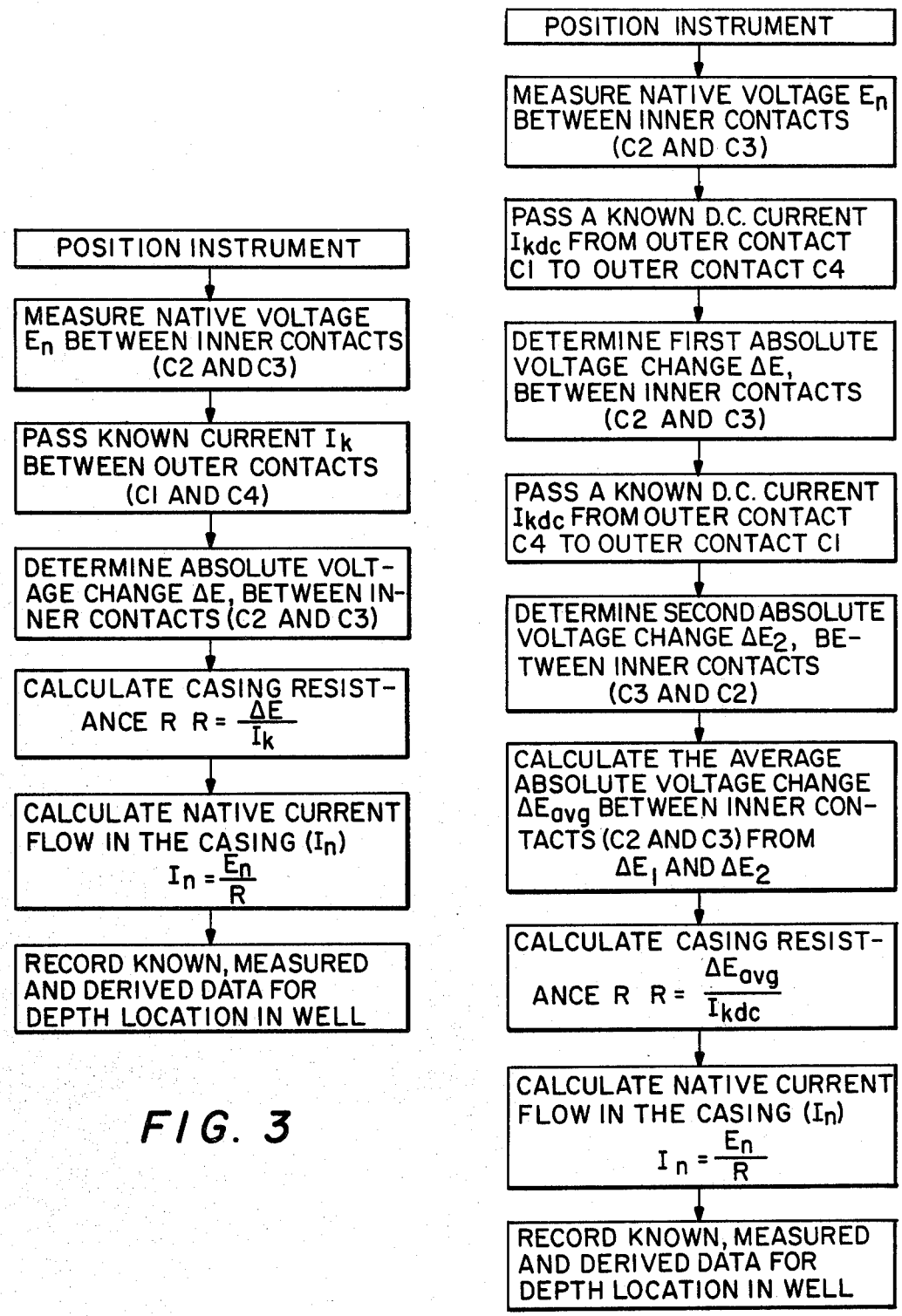
FIG. 3 is a flow chart representing the general steps of the method of this invention that are associated with determining the current flow.
FIG. 4 is a flow chart representing the general steps of an alternate embodiment of a method of this invention associated with determining the current flow.

Next, the native current flow $I_n$ in the casing can be calculated from the voltage $E_n$ and the casing resistance R as per the equation in FIG. 3. The native current flow in the casing may be contained within the well casing or it may be partially or totally leaving the casing. This direction of current movement is determined by observing the direction of slope of the graph of native state voltage $E_n$ at the depth location where the resistance R is measured (see FIG. 7). Zones of the well in which native current $I_n$ leaving the casing have a negative slope. The magnitude of this current flow $I_n$ leaving the casing is the difference in native current mesured in adjacent successive locations.

Once the above measurements and calculations have been made they are recorded in the appropriate recording and display portion 36 of surface equipment 20. This record includes a correlatable record between the native current flow $I_n$ and the depth location in the well at which the measurement was taken. A final calculation and graph can be made showing the rate of metal loss from the well casing as is well known in the art. The presently accepted basis for this metal loss calculation is that for each ampere of current flow leaving the casing it carries with it twenty (20) pounds (about 9 kilograms) of metal in one year. Additionally this record can include the relative position of the casing collars to the location at which the measurement was taken so that in the future a repeat measurement in substantially the same location can be made accurately for comparison purposes.

An alternative embodiment (2) to the above described steps for carrying out the method of this invention is illustrated in FIG. 4. In this alternative a known direct current is passed between the outer contacts in one direction while the voltage measurement is taken between the inner contacts and then the known direct current is passed in the reverse direction while the voltage measurement is taken again. The first step in this method of determining the natural current flow is to measure and plot the native voltage $E_n$. A plot of this natural voltage is depicted in FIG. 7. In this graph a positive slope of the curve (upper left to lower right) indicates that current staying within or entering the well casing. A negative slope of this curve (lower left to upper right) indicates that current is leaving the well casing and passing into the earth formation. This measurement is accordingly recorded.

Next, a known current $I_k$ is passed between the outermost contacts C1 and C4 of the instrument by using current source 32 in the surface equipment. This current is passed between the outermost contacts C1 and C4 in order that it passes through the casing between the inner contacts C2 and C3 for the measurement of a voltage. In the passing of known current $I_k$ it is to be noted that passing the current in one direction will cause the total current flow in the casing to be increased due to both the native current $I_n$ and the known current $I_k$ traveling in the same direction. Alternatively in passing the known current $I_k$ in the opposite direction will decrease the total current flow in the casing because the native current $I_n$ and the known current $I_k$ will be moving in opposite directions or bucking each other. Thus in this situation the total or accumulative current flow in the casing will be less than that which would occur if both currents were traveling the same direction. In regard to determining the magnitude of the native current $I_n$ the direction of application of the known current $I_k$ can be varied at the desire of the person(s) practicing this method without departing from the spirit or scope of the invention. Calculations for determining $I_n$ and R can be done by the formulas shown in FIG. 3 without regard to the direction of application of the known current $I_k$.

Next, a measurement of the absolute voltage change E between the innermost contact C2 and C3 is made by using voltmeter 28 in earth surface equipment 20. This absolute voltage change measurement may be an entirely positive measurement provided that the native voltage measured above was positive initially however if this native voltage was initially negative the measurement of the absolute voltage change will be in combination of the initial amount of negative voltage plus the measured amount of positive voltage.

Next, the actual casing resistance R is calculated as per the equation in FIG. 3 by dividing the absolute voltage change E by the known current. The resulting value of resistance is a determined value of resistance for the segment of the casing between C2 and C3. This value of resistance for the casing will obviously depend upon the physical condition of the casing and will obviously vary depending upon the extent of corrosion of the casing.

Next, the native current flow $I_n$ in the casing can be calculated from the voltage $E_n$ and the casing resistance R as per the equation in FIG. 3. The native current flow in the casing may be contained within the well casing or it may be partially or totally leaving the casing. This direction of current movement is determined by observing the direction of slope of the graph of native state voltage $E_n$ at the depth location where the resistance R is measured (see FIG. 7). Zones of the well in which native current $I_n$ leaving the casing have a negative slope. The magnitude of this current flow $I_n$ leaving the casing is the difference in native current measured in adjacent successive locations.

Once the above measurements and calculations have been made they are recorded in the appropriate recording and display portion 36 of surface equipment 20. This record includes a correlatable record between the native current flow $I_n$ and the depth location in the well at which the measurement was taken. A final calculation and graph can be made showing the rate of metal loss from the well casing as is well known in the art. The presently accepted basis for this metal loss calculation is that for each ampere of current flow leaving the casing it carries with it twenty (20) pounds (about 9 kilograms) of metal in one year. Additionally, this record can include the relative position of the casing collars to the location at which the measurement was taken so that in the future a repeat measurement in substantially the same location can be made accurately for comparison purposes.

An alternative embodiment (2) to the above described steps for carrying out the method of this invention is illustrated in FIG. 4. In this alternative a known direct current is passed between the outer contacts in one direction while the voltage measurement is taken between the inner contacts and then the known direct current is passed in the reverse direction while the voltage measurement is taken again. This variation in the method of determining the natural current flow in a well's casing compensates for any inaccuracy that might be occasioned by making voltage measurements with the current passing in only one direction. In following this alternative method the steps are described as follows:

First the downhole instrument is positioned at the selected location within a well's casing and it is determined that the contacts thereof are making suitable electrical contact with the well's casing interior surface.

Next, the native voltage $E_n$ is measured between inner contacts C2 and C3 by voltmeter 28 in earth's surface equipment 20.

Next, a known direct current $I_{kdc}$ is passed through the well casing from outer contact C1 on the upper portion of the instrument to outer contact C4 at the lower portion of the instrument.

Next, a first voltage change $E_1$ between the inner contacts C2 and C3 is determined. This determination is accomplished by measuring the voltage between contacts C2 and C3 and combining with the measured native voltage $E_n$ measured above.

Next, a known dc current $I_{kdc}$ is passed through the casing from the lower outer contact C4 to the upper outer contact C1. The directional current flow of this known direct current is opposite to that passed previously. The magnitude of this known direct current is preferably selected to be substantially the same magnitude as the previously used current. It is possible to use a known current of different magnitude for making these voltae measurements. However doing this requires making adjustments to the voltage measurement. Therefore where possible substantially the same magnitude of known current is preferably used in order to simplify the calculations.

Next, a second absolute voltage change $E_2$ is determined between inner contacts C3 and C2. This is accomplished by combining a voltage measured at this time between contacts C3 and C2 with the measured native voltage $E_n$ measured previously.

Next, the average absolute voltage change $E_{avg}$ is determined between the inner contacts C2 and C3 from the determined voltage changes $E_1$ and $E_2$. This average absolute voltage change represents a change in voltage occurring due to the artificially imposed current $I_{kdc}$ passing through the casing. Next, the casing resistance R is calculated from the average absolute voltage change $E_{avg}$ and the known current value $I_{kdc}$ as per the equation in FIG. 4. This value of resistance R represents the resistance of the casing between contacts C2 and C3.

Next, the native current flowing through the casing $I_n$ is calculated by using the measured native voltage $E_n$ and the determined casing resistance R as per the equation appearing in FIG. 4. The calculated native current $I_n$ represents the amount of direct current flowing in the well casing between contacts C2 and C3.

Next, the recorded, known, measured and derived data for the above described measurements, determination and calculations are recorded relative to the depth location in the well. This record is useful to compare with similar measurements taken at other locations within the well. Also this data is helpful at a later date for comparative analysis of the condition of the well after it hs been in service for some time.

Figures 5, 6:
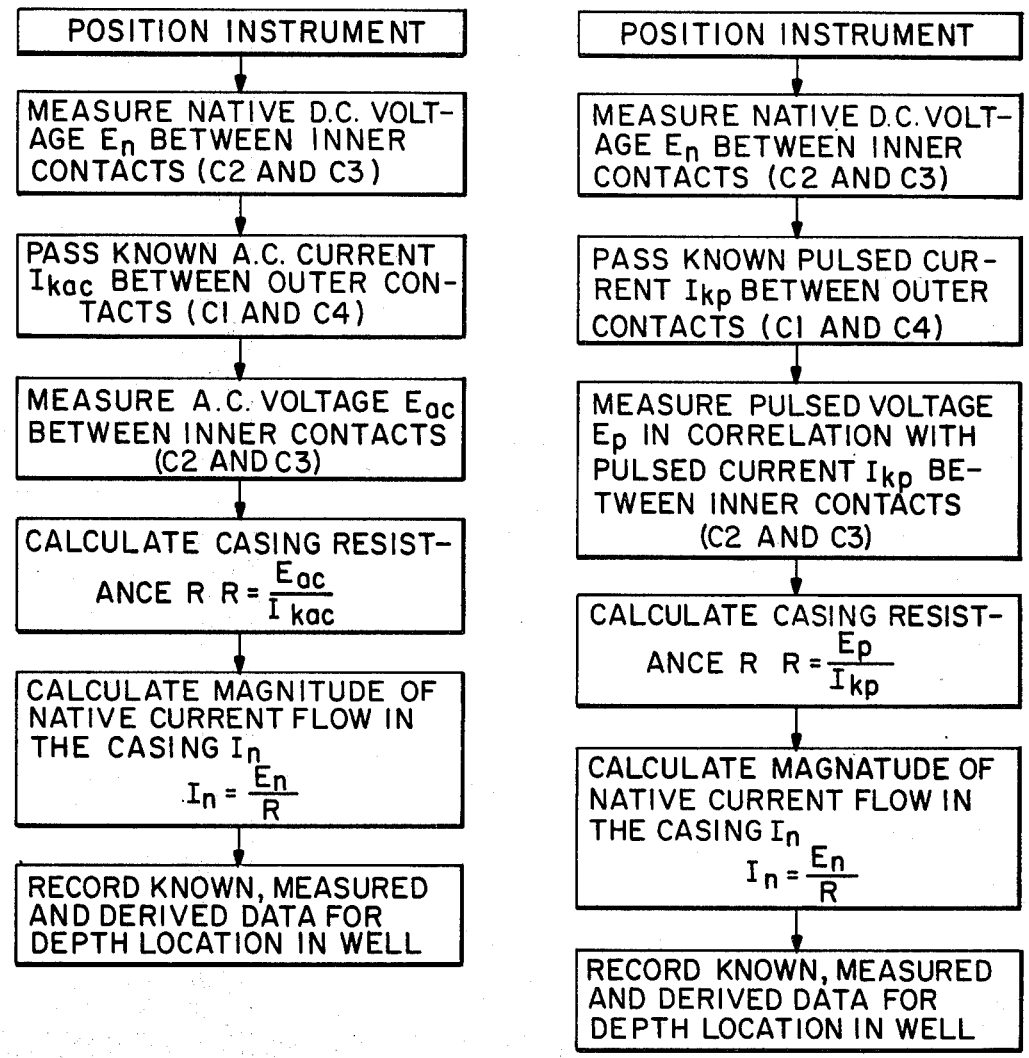
FIGS. 5 and 6 are flow charts of alternate methods of practicing the method of this invention.

Another alternate embodiment (3) of the method of determining the native current flow in a well is to use this instrument and pass a known alternating current between the contacts thereof and make appropriate measurements and determinations to calculate the native current flow. In following this method the instrument is used in the mechanical configuration described above with only the steps of the method of making the determination being varied. This alternative method of determining the casing current flow is described below and the outlined steps of the method are illustrated in FIG. 5:

First, the instrument is positioned at the desired selected location within the well casing. Also it is determined that the several contacts of the instrument are making suitable, good electrical contact with the casing interior wall surface.

Next, the native direct current voltage $E_n$ between inner contacts C2 and C3 is measured. This is done by using voltmeter 28 in surface equipment 20.

Next, a known alternating current $I_{kac}$ is passed between the instruments outer contacts C1 and C4. This alternating current is selected to have a magnitude and frequency to be suitably measured between the inner contacts C2 and C3 and not to substantially disturb the direct current nature of the native voltage present. This alternating current $I_{kac}$ is supplied from current source 32 in the earth surface equipment 20.

Next, the average ac voltage $E_{ac}$ is measured between inner contacts C2 and C3. This AC voltage $E_{ac}$ is measured by voltmeter 28 in earth surface equipment 20.

Next, the casing resistance R is calculated as per the equation in FIG. 5 by using the measured average AC voltage $E_{ac}$ and the known AC current $I_{kac}$. This resistance R represents the resistance of the casing between inner contacts C2 and C3.

Next, the magnitude of the native current flow through the casing $I_n$ between inner contacts C2 and C3 is determined from the equation appearing in FIG. 5. This is done by utilizing the casing resistance R and the measured native voltage $E_n$.

Last, the known, measured and derived data described above is recorded for the particular depth location in the well.

Another embodiment (4) of the method of determining the native current flow in a well is to use this instrument and pass a known pulsating current between the contacts thereof and make appropriate measurements and determinations to calculate the native current flow. In following this method the instrument is used in the mechanical configuration described above with only the steps of the method of making the determination being varied. This alternative method of determining the casing current flow is described below and the steps are outlined in FIG. 6.

First, the instrument is positioned at the desired selected location within the well casing. Also it is determined that the several contacts of the instrument are making suitable, good electrical contact with the casing interior wall surface.

Next, the native direct current voltage $E_n$ between inner contacts C2 and C3 is measured. This is done by using voltmeter 28 in surface equipment 20.

Next, a pulsed current of known value $I_{kp}$ is passed between the instruments outer contacts C1 and C4. This pulsed current is selected to have magnitude and frequency pulsation rate to be suitably measured between the inner contacts C2 and C3. This pulsed current is selected such that its frequency, magnitude and duration of pulses will not substantially disturb the well conditions which produce the native voltage present in the well. This pulsed current $I_{kp}$ is supplied from current source 32 in the earth surface equipment 20. In addition to the current and voltage measuring equipment at the earth surface a timing circuit is provided in switching circuit 34 for use with this embodiment of this invention to correlate and properly sequence the current pulses and voltage measurements.

Next, the associated pulsed voltage $E_p$ is measured between inner contacts C2 and C3. This pulsed voltage $E_p$ is measured by voltmeter 28 in earth surface equipment 20. The measurement of this voltage $E_p$ is done in correlation with the pulsed current $I_p$ so that peak or instantaneous resistance can be determined. This correlation is necessary so that corresponding voltages and currents can be measured in view of the natural and well known phase relationship of these parameters.

Next, the casing resistance R is calculated as per the equation in FIG. 6 by using the pulsed voltage $E_p$ and the known pulsed current $I_{kp}$. This resistance R represents the resistance of the casing between inner contacts C2 and C3.

Next, the magnitude of the native current flow through the casing $I_n$ between inner contacts C2 and C3 is determined from the equation appearing in FIG. 6. This is done by utilizing the casing resistance R and the measured native voltage $E_n$.

Last, the known, measured and derived data described above are recorded for the depth location at which these measurements and determinations were made.

As will become apparent from the foregoing description of the applicant's apparatus and method for determining the natural current flow in well casing, it can be used in conventional well logging type operations in order to determine to some extent the rate of corrosion of the casing in a well and to determine to what extent if necessary that cathodic protetion for the well should be implemented or modified. The structure is arranged such that it can be easily passed through the casing of a well and operated therein to measure the current casing resistance and the current flow at selected locations within the well. The method of operation of this invention provides for a determination of the casing's actual resistance at the location where the native current relative to the well is being determined rather than using the guesswork and approximations as was done in the prior art for making such determinations.

Although specific preferred emodiments of the method and apparatus of this invention have been described in detail in the preceding description this description is not intended to limit the invention to the particular form of embodiment disclosed herein since they are to be recognized as illustrative rather than restrictive and it would be obvious to those skilled in the art that the invention is not so limited. For example, the skeletal like housing of the instrument could have the insulating elements, couplers and weighting elements combined within a single flask or housing. Also the rollers of the electrodes can be replaced by non rotatable contact members.

Thus, the invention is declared to cover all changes and modifications of these specific examples of the invention herein disclosed for purposes of illustration which does not constitute departures from the spirit and scope of the invention.

The embodiments of the invention in which an exclusive property or privilege is claimed or defined as follows:

1. A method for determining the current flow in well casing, comprising the steps of:
   (a) measuring native voltage in a well's casing between two locations within a string of well casing;
   (b) passing a known current through the well casing such that is passes through the locations at which the native voltage was measured;
   (c) determining the absolute voltage change, in the well casing at the locations at which the native voltage was measured from the value of the native voltage to another voltage value occurring during said passing of a known current;
   (d) determining the casing's resistance from the absolute voltage change measurement and the known current;
   (e) determining the native current flow in the casing from the absolute voltage change and the casing resistance.

2. The method of claim 1, wherein:
   (a) said steps of measuring native voltage and determining absolute voltage are done between longitudinally adjacent electrodes spaced longitudinally within a well's casing; and
   (b) said step of passing a known current is done between a second pair of electrodes having a spacing greater than the first pair of electrodes and having the first pair of electrodes located between the second pair of electrodes.

3. The method of claim 2, wherein:
   (a) said steps of measuring and determining voltages and passing current are done at one location within a well's casing;
   (b) a recording is made of the casing resistance, the current, the native voltage and the depth location within the well at which the measurements are taken; and
   (c) the electrodes are moved to another location within a well and the steps of this method are repeated.

4. The method of claim 1, wherein said passing a known current is done with the known current being passed in the same relative direction within a well at all locations within a well at which the measurements and current flow determinations are made.

5. The method of claim 1, wherein said passing a known current is done with the known current being passed in the same relative direction as the native current flow in a well casing.

6. The method of claim 1, wherein said passing a known current is done with the known current being passed in the direction opposite to that of the native current flow in a well casing.

7. The method of claim 1, wherein:
   (a) steps of said passing a known current and said determining the absolute voltage change are done in a sequence wherein a known current is passed in one relative direction in a well and the absolute voltae change is measured then a known current is passed in the opposite relative direction and the absolute voltage change is determined again; and
   (b) said determining the casing's resistance includes averaging the absolute voltage change values and using the known current to determine the casing's resistance.

8. The method of claim 1, wherein said passing a known current includes the passing of a known alternating current, and said determining the absolute voltage change includes measuring an average voltage change value during the said passing of a known current.

9. The method of claim 1, wherein said passing a known current includes the passing of a known pulsed current, and said determining the absolute voltage change includes measuring a peak pulse voltage value in correlation with the known pulsed current.

10. A method for determining the current flow in well casing, comprising the steps of:
    (a) measuring native direct current voltage in a well's casing between two locations within a string of well casing;
    (b) passing a first known direct current through the well casing in one relative direction such that it passes through the locations at which the native voltage was measured;
    (c) determining the absolute direct current voltage at locations at which the native voltage was measured, from the native voltage to a voltage value resulting from said passing of the first known current while passing the first known current;
    (d) passing a second known direct current through the well casing in a direction opposite to the direction of passing said first known current;
    (e) determining the absolute voltage change, at the locations at which the native voltage was measured from the value of the native voltage to a voltage value resulting from said passing of the second known current while passing the second known current;
    (f) determining an average absolute voltage change from the preceding absolute voltage change determinations;
    (g) determining the casing resistance from the average absolute voltage change and the known currents;
    (h) determining the native current flow in the casing from the average absolute voltage change and the casing resistance.

11. The method of claim 10, wherein:
    (a) said steps of measuring native voltage and determining absolute voltages are done between longitudinally adjacent electrodes spaced longitudinally within a well's casing; and
    (b) said steps of passing a known current are done between a second pair of electrodes having a spacing greater than the first pair of electrodes and wherein the first pair of electrodes located between the second pair of electrodes.

12. The method of claim 10, wherein:
    (a) said steps of measuring and determining voltages and passing currents are done at one location within a well's casing;
    (b) a recording is made of the casing resistance, the determined currents, the native voltage and the depth location within the well at which the measurements are taken and the determinations made; and
    (c) the electrodes are moved to another location within a well and the steps of this method are repeated.

13. A method for determining the current flow in well casing, comprising the steps of:

(a) measuring native direct current voltage in a well's casing between two longitudinally spaced adjacent locations within a string of well casing;

(b) passing a first known direct current through the well casing between two longitudinally spaced second locations positioned in longitudinally spaced relation to the first named location and having the first named locations therebetween in one relative direction such that it passes between the locations at which the native voltage was measured;

(c) determining a first absolute direct current voltage change, at the locations at which the native voltage was measured, from the value of the native voltage to a voltage value resulting from said passing of the first known current while passing the first known current;

(d) passing a second known direct current through the well casing between the named locations in a direction opposite to the direction of passing said first known current;

(e) determining a second absolute voltage change, at the locations at which the native voltage was measured from the value of the native voltage to a voltage value resulting from said passing of the second known current while passing the second known current;

(f) determining an average absolute voltage change from the preceding first and second absolute voltage change determinations;

(g) determining the casing resistance from the average absolute voltage change and the known currents;

(h) determining the native current flow in the casing from the average absolute voltage change and the casing resistance.

14. The method of claims 13, wherein in said passing a first known direct current and said passing a second known current the magnitude of said currents is substantially the same value.

15. The method of claim 13, wherein in said passing a first known direct current and said passing a second known current the individual magnitudes of these known currents are not substantially the same value.

16. A method for determining the current flow in well casing, comprising the steps of:

(a) measuring native direct current voltage in a well's casing between two locations within a string of well casing;

(b) passing a first known alternating current through the well casing such that is passes through the locations at which the native voltage was measured, (c) measuring the average alternating current voltage at the locations at which the native voltage was measured resulting from said passing of the known alternating current;

(d) determining the casing resistance from the average absolute voltage change and the known currents;

(e) determining the native current flow in the casing from the average absolute voltage change and the casing resistance.

17. The method of claim 16, wherein:

(a) said step of measuring native voltage and measuring the average alternating current voltage is done between longitudinally adjacent electrodes spaced longitudinally within a well's casing; and (b) said step of passing a known current are done between a second pair of electrodes having a spacing greater than the first pair of electrodes and having the first pair of electrodes located between the second pair of electrodes.

* * * * *